United States Patent [19]

Adams

[11] Patent Number: 4,779,694
[45] Date of Patent: Oct. 25, 1988

[54] POWER ASSISTED VEHICLE STEERING MECHANISM

[75] Inventor: Frederick J. Adams, Avon, England

[73] Assignee: TRW Cam Gears Limited, Avon, England

[21] Appl. No.: 54,196

[22] Filed: May 26, 1987

[30] Foreign Application Priority Data

Jun. 9, 1986 [GB] United Kingdom ............... 8613952
Jul. 18, 1986 [GB] United Kingdom ............... 8617557

[51] Int. Cl.⁴ .............................................. B62D 5/08
[52] U.S. Cl. ....................................... 180/148; 74/498
[58] Field of Search ........................... 180/148, 79.1; 74/388 PS, 498, 422

[56] References Cited

U.S. PATENT DOCUMENTS 2,931,239  5/1960  Dietrich ..................... 74/388 PS
3,347,109  10/1967  Adams et al. .................. 74/498
3,352,170  11/1967  Adams ......................... 74/498 X
3,753,375  8/1973  Colletti ........................ 74/498
3,897,845  8/1975  Von Lowis ..................... 180/148
4,607,717  8/1986  Nakayama .................... 180/148 X

FOREIGN PATENT DOCUMENTS 57-70773  5/1982  Japan ........................... 180/148

Primary Examiner—John A. Pekar
Attorney, Agent, or Firm—Tarolli, Sundheim & Covell

[57] ABSTRACT

A power assisted vehicle steering mechanism having a rack and pinion assembly, including a pinion shaft adapted at one end to receive a steering wheel, a pinion on the steering shaft engaging a rack connected to effect steering of the vehicle, a bearing for the pinion shaft located between the pinion and said one end, said bearing permitting angular play of the pinion shaft, the pinion shaft having a portion thereof connected to transmit angular movement of the pinion shaft due to steering torque to a power assistance means to augment steering torque.

26 Claims, 6 Drawing Sheets

POWER ASSISTED VEHICLE STEERING MECHANISM

This invention relates to a power assisted vehicle steering mechanism having a rack and pinion assembly.

It is known to provide a laterally movable pinion in a power assisted vehicle steering mechanism, the pinion moving on steering torque being applied through the steering wheel of the vehicle and this movement actuating power assistance means to augment steering torque.

In one particular prior proposal disclosed in Japanese Patent Specification No. 57-70773, FIG. 1 shows a pinion shaft mounted in ball bearings located in elongate holes which permit the bearings to move from side to side but not up and down. If a rotary motion is applied to the pinion shaft by turning the steering wheel of the vehicle, the pinion will move relative to the rack because the bearings will move to one end of their locating holes, the pinion shaft moving sideways in a direction normal to the axis of the pinion. This movement is utilised by mounting a saddle (FIG. 3) on the pinion and providing an arm extending from the saddle.

A part-spherical bearing is secured to the arm and is received in an aperture in the pinion housing. The rotary motion applied to the pinion shaft, together with the ability of the shaft to move sideways, causes the arm to move and displace an axial spool of a valve which controls the flow of hydraulic fluid to and from a power assistance motor.

In FIGS. 5 and 6 of the Japanese publication, a similar arrangement is shown but, in this embodiment, the spool of the valve lies parallel with the rack, not at right angle thereto as in the FIG. 1 embodiment. A spring centralises the spool in each embodiment.

In a further prior proposal as disclosed in British Patent Specification No. 720321, a steering pinion mounted on a shaft engages the teeth of a rack bar an extension of which forms a piston rod carrying a piston slidable in a cylinder. Fluid inlet and outlet connections enable the cylinder to be coupled to a source of fluid pressure and to a reservoir.

The shaft carries a cylindrical block which is slidable transversely of the shaft in a bore in the pinion housing and the block is urged to hold the shaft in a central position in the housing by springs and pins having heads at one end and threads for nuts at the other. The nuts enable accurate centralisation of the shaft to be obtained when the assembly is set up initially.

The block has an arm extending from it which is connected via a link with a pivoted double lever connected at its most distant end through a pin and fork connection with the spool of an axial valve. This valve controls the distribution of fluid to and from the cylinder. The steering shaft beyond the pinion is extended to lie in a bearing. This extension is somewhat less than the diameter of the bearing and, during the initial setting up of the assembly, the extension is centralised in the bearing so that a clearance exists all around it.

In operation, rotation of the steering shaft turns the pinion which reacts against the teeth of the rack so as to push the shaft extension into contact with its bearing thus displacing the shaft sufficiently to cause the block to slide in its bore. This movement of the block results in the lever pivotting and, because of the ratio of the leverages of the two ends of the lever, the spool of the valve is moved in the appropriate direction to control the flow of fluid to and from the cylinder.

OBJECT OF THE INVENTION

It is the main object of this invention to provide a power assisted vehicle steering mechanism which is more sensitive than hitherto proposals and which, by virtue of its inherent construction, is less prone to wear. A subsidiary object is to provide, in such a power assisted vehicle steering mechanism, a means which will give a degree of "feel" to the steering of the vehicle which may be dependent on one or a number of parameters such as the speed of the vehicle.

STATEMENTS OF INVENTION

According to the present invention there is provided a power assisted vehicle steering mechanism having a rack and pinion assembly, including a pinion shaft adapted at one end to receive a steering wheel, a pinion on the steering shaft engaging a rack connected to effect steering of the vehicle, a bearing for the pinion shaft located between the pinion and said one end, said bearing permitting angular play of the pinion shaft, the pinion shaft having a portion thereof connected to transmit angular movement of the pinion shaft due to steering torque to a power assistance means to augment steering torque.

The pinion shaft may have a portion thereof extending on the other side of the pinion from the said bearing, the connection to the power assistance device being from said extension portion.

The said pinion shaft may be provided with a second bearing located on its extension portion, which second bearing engages an aperture in a lever pivoted at one end, the other end actuating the power assistance means. The said lever may be provided with a hole which registers with a further hole in a static part of the mechanism so that a pin may be inserted through both holes for initial centralisation of the lever to be achieved during setting up of the mechanism.

The said bearing between the one end of the pinion shaft and the pinion may include a part-spherical bearing.

Conveniently, the power assistance means may be actuated by movement of a spool of a spool valve.

The spool of the spool valve may have centralising means such as a spring which is compressed when the spool is moved in either axial direction, the reaction of the spring thus tending to centralise the spool to its neutral position.

Alternatively, part of the spool may pass through an hydraulic chamber the hydraulic pressure within which reacts against movement of the spool and tends to centralise the spool to its neutral position. The hydraulic pressure within the chamber may be dependent on the pressure existing in a steering system and derived from an engine driven pump, or the pressure output of a pump driven by the vehicle transmission system or on the pressure output of a pump driven by an electric motor the speed of which is determined by one or more of a variety of parameters such as vehicle speed, weight, and lateral acceleration. The hydraulic pressure may be fed to the chamber directly through the casing or axially along the spool valve itself from one of the valve ports.

Conveniently, sensor means is provided to detect angular movement of the pinion shaft due to steering torque, said detection means actuating said power assistance means. The sensor means may comprise a pair of micro-switches, a Hall effect device or other sensor dependent on the movement of one of its parts.

DRAWINGS

SPECIFIC DESCRIPTION

Figure 1:
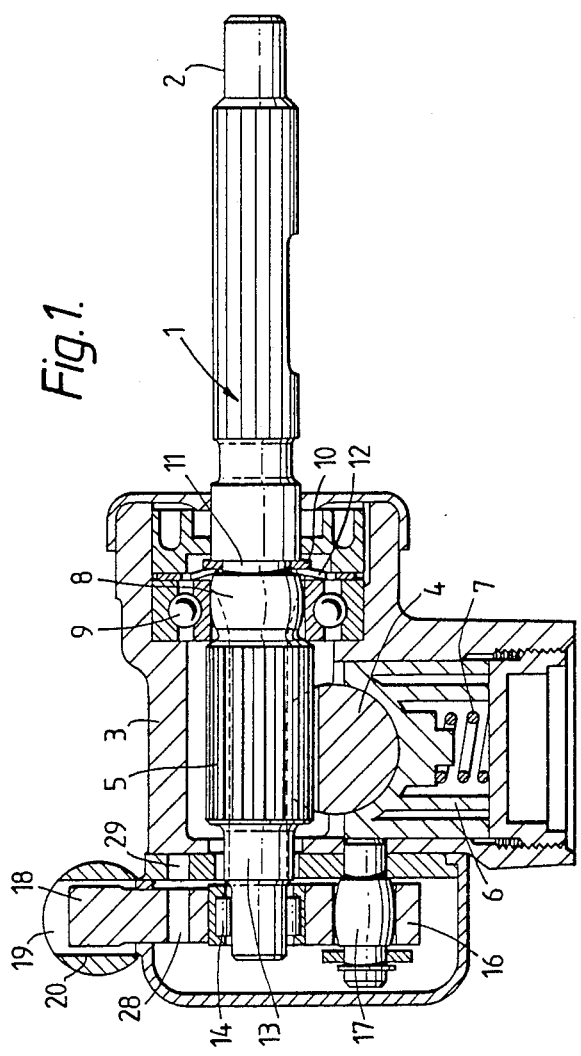
FIG. 1 is a part longitudinal sectional view of a steering mechanism constructed according to the invention.
Figure 2:
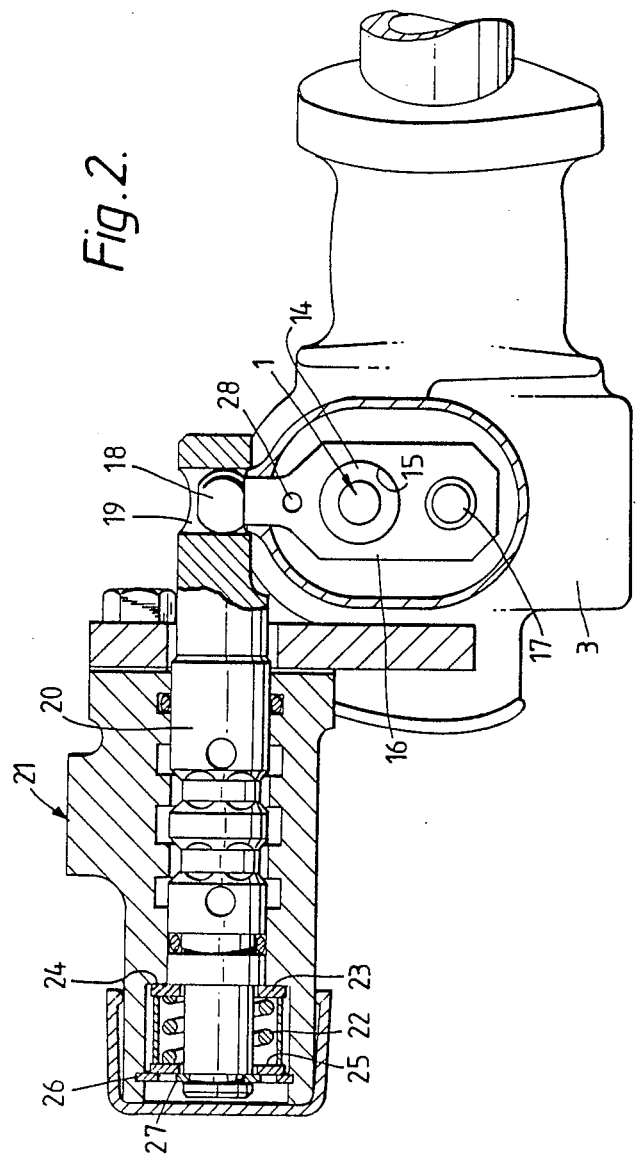
FIG. 2 is a further part sectional view of the mechanism of FIG. 1.

In the drawings and referring first to FIGS. 1 and 2, a vehicle steering mechanism includes a pinion shaft 1 adapted to receive, at one end 2, a steering shaft. The other end portion of the pinion shaft 1 enters a casing 3 which houses a rack 4 engaging a pinion 5 on the pinion shaft 1. The rack 4 is urged against the pinion 5 by yoke 6 and spring 7.

Between the one end 2 of the pinion shaft 1 and the pinion 5 is a bearing 8 which is part-spherical and which is carried by the inner race of a roller bearing 9 mounted in casing 3. A circlip 10 sprung into an annular recess 11 in pinion shaft 1 traps a Belleville spring washer 12 against the inner race of the roller bearing 9.

On the side of the pinion 5 remote from the bearing 8, the pinion shaft has an extension 13 around part of which is a roller bearing 14 in an aperture 15 in a lever 16. This lever 16 is pivoted on pin 17 at one end and, at its other end, is provided with a head 18 which lies in an aperture 19 at one end of a spool 20 of a spool valve 21. This spool valve is of known construction to permit hydraulic fluid flow to augment steering torque.

At the left hand end (as seen in FIG. 2) of the spool 20 is a spring 22 which locates between washer 23, which bears against shoulder 24; and washer 25, which bears against circlips 26 and 27. This spring 22 is for restoring the spool 20 to its centralised position in which fluid can flow freely through the valve, after the spool 20 has been moved during a steering manoeuvre.

The lever 16 is provided with a hole 28 which registers (when the lever 16 is in its neutral position) with a recess 29 in the casing 3. A pin (not shown) can be inserted through hole 28 and into recess 29 to set up the assembly during manufacture.

In operation, rotation of the pinion shaft 1 causes the pinion to react with the rack thereby tilting the pinion shaft to one side or the other (towards or away from you as you look at FIG. 1), and this movement of the pinion shaft 1 causes the lever 16 to rotate about pin 17 so that the spool 20 is moved axially in its housing.

With the present construction, sensitivity is improved over previous proposals and there are few wearing parts thus giving a long working life to the assembly.

Figure 3:
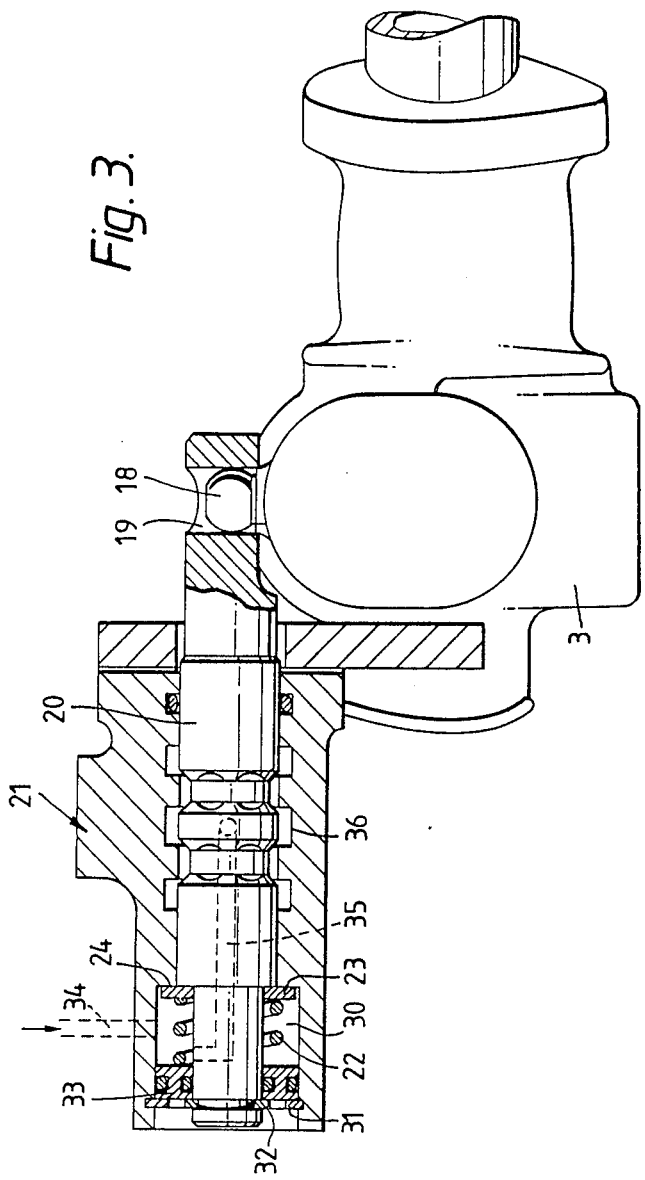
FIG. 3 is a part longitudinal sectional view of a modified steering mechanism constructed according to the invention.
Figure 4:
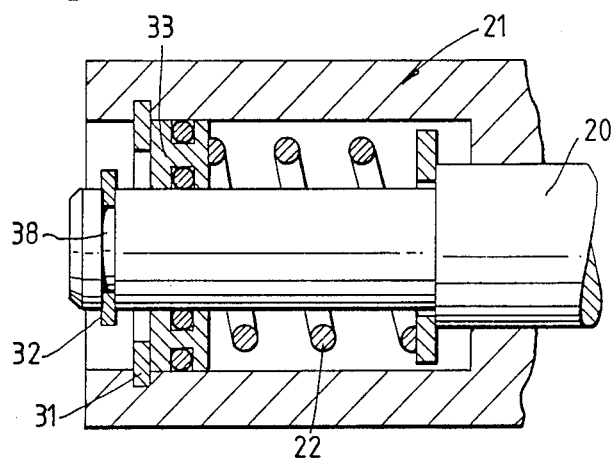
FIG. 4 is a diagrammatic view of part of the mechanism of FIG. 3 in one position.
Figure 5:
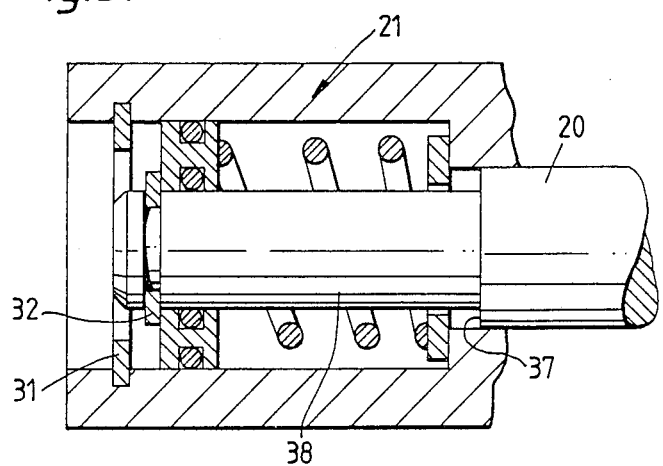
FIG. 5 is a view similar to FIG. 4 showing the mechanism in a further position.

Referring now to FIGS. 3 to 5, these show a modification of the centralising means at the left hand end (as seen in FIG. 2) of the spool 20. In FIGS. 3 to 5 there is provided a spool 20 (as in the previous embodiment) part of which passes through an hydraulic pressure chamber 30 within which is a washer 24 bearing against a shoulder 23. The casing 21 retains a circlip 31 and the spool 20 carries a circlip 32 there being located between the spool 20 and the casing 21 a packing 33 which defines one end of the chamber 30. A spring 22 is located within the chamber 30.

Hydraulic pressure from a source is fed to chamber 30 through the casing 21 via a pipe 34 and this source may be provided by a pump driven by the engine of the vehicle. Alternatively, the source may be provided by a pump driven by the transmission system of the vehicle, or by a pump driven by an electric motor the speed of which is determined by one or more of a variety of parameters such as vehicle speed, weight and lateral acceleration.

The pipe 34 may be dispensed with and an axial bore 35 communicate the chamber 30 with a port 36 of the spool valve if the pressure within chamber 30 is to be dependent on the degree of power assistance.

In order that the centralising pressure exerted by the hydraulic fluid in chamber 30 is equal in both axial directions of the spool 20, the surface area presented at one end of the chamber 30 by the shoulder 37 (see FIG. 5) i.e., the difference between the cross-sectional areas of spool 20 and the extension 38, should be one half of the cross-sectional area of the packing 33 presented at the other end of the chamber 30.

It will be appreciated that since the pressure in chamber 30 is dependent on the speed of the vehicle, the "feel" of the steering will change from light at slow speeds to heavy at high speeds since the pressure in chamber 30 will be low at low speeds and high at high speeds.

Figure 6:
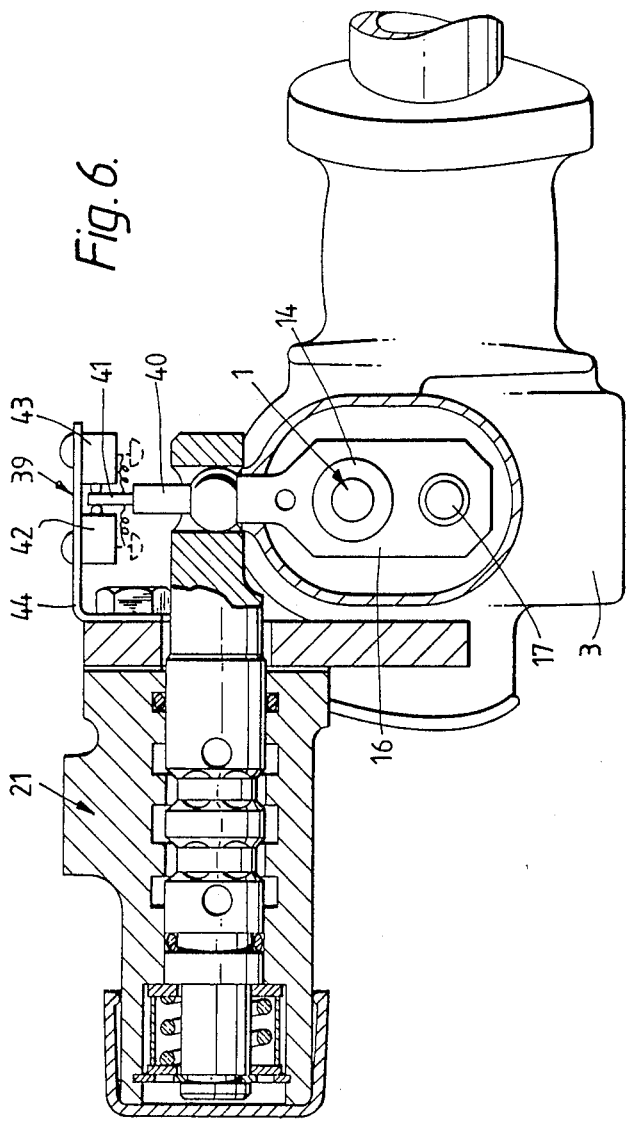
FIG. 6 is a view similar to FIG. 2 showing sensor means.

Referring now to FIG. 6 which shows an embodiment of the invention similar to that of FIGS. 1 and 2 but with a sensor means, generally indicated at 39. Lever 16 of FIG. 2 is modified in that it is provided with an extension 40 carrying a plate 41 located between two micro-switches 42 and 43 mounted on bracket 44 attached to the casing 3. These micro-switches act as sensor means and it will be appreciated that clockwise or anti-clockwise rotation (as seen in FIG. 6) of lever 16 about pin 17 caused by steering torque will actuate either micro-switch 43 or 42 respectively. Such actuation will energise a motor to drive a pump to supply fluid pressure to the spool valve 21.

The use of sensor means in this way obviates the necessity of the pump which supplies fluid pressure to the spool valve 21 being driven continuously and hence increases the working life of the mechanism.

Figure 7:
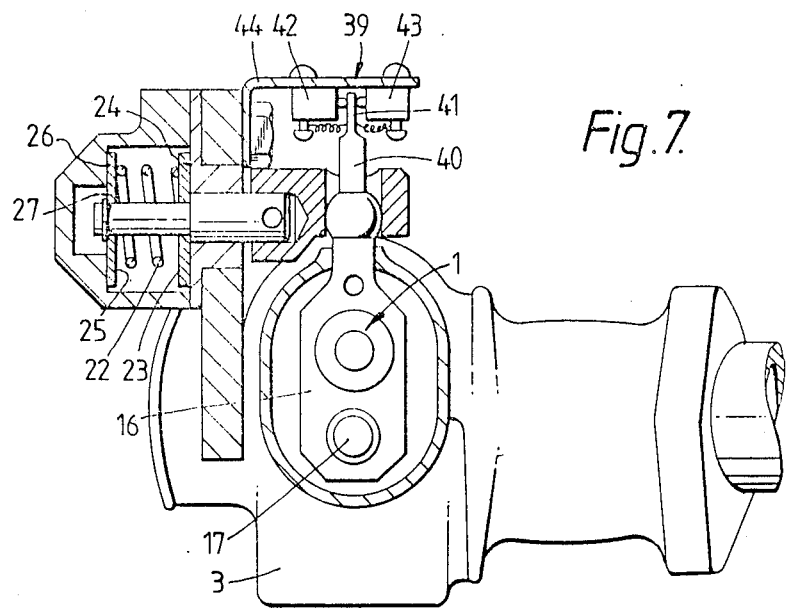
FIG. 7 is a part sectional view of a modified form of the sensor means of FIG. 6.

FIG. 7 shows the same sensor means 39 as in FIG. 6 but without the spool valve 21. Centralising means 22 to 27 are provided as in the FIG. 2 embodiment. In the embodiment of FIG. 7, no hydraulics are provided and the sensor means 39 will directly energise an electric power assistance means, for example, a stator which surrounds part of the pinion shaft so that the flux produced on energisation of the stator windings will provide torque to assist steering. Such devices are well known in the art and require no further explanation.

Figure 8:
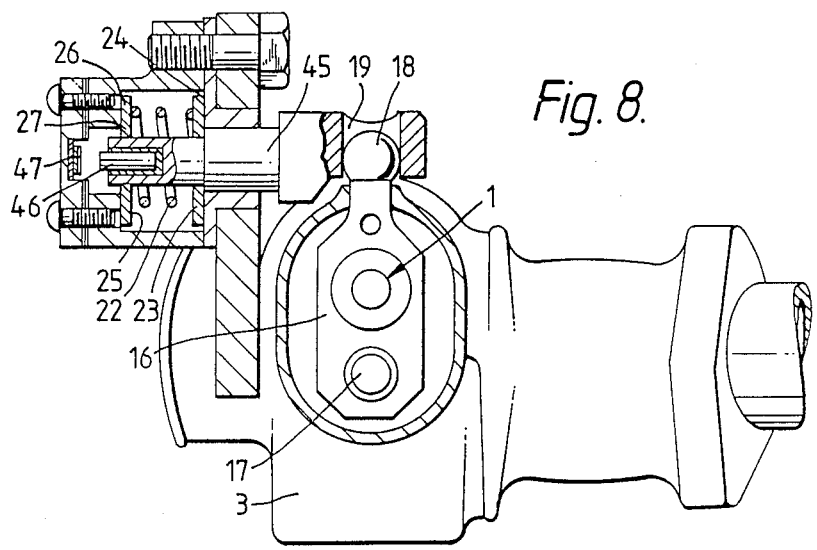
FIG. 8 is a part sectional view of a further form of sensor means for use in the invention.

Instead of using micro-switches and the sensor means, a Hall effect device may be used and such is shown in FIG. 8. Rotation of lever 16 due to steering torque moves a rod 45 at one end of which is a magnet 46. Movement of magnet 46 creates electrical flow in pick up 47 which is amplified and fed to an electric power assistance means such as that described above for the FIG. 7 embodiment. Centralisation of the rod 45 and hence magnet 46 is achieved through centralising means 22 to 27 as before.

Instead of the extension of the pinion shaft being connected through a bearing to the spool valve, there could be a direct linkage arrangement. Also, the part-spherical bearing 8 may be dispensed with and the pinion shaft 1 simply be surrounded by a bearing such as bearing 9 so long as a certain amount of play is permitted to allow for the tilting movement of the pinion shaft in response to steering torque.

I claim:

1. A power assisted vehicle steering mechanism having a rack and pinion assembly including a pinion shaft adapted at one end to receive a steering wheel, a pinion on the steering shaft engaging a rack connected to effect steering of the vehicle, a bearing for the pinion shaft located between the pinion and said one end, said bearing permitting angular play of the pinion shaft, the pinion shaft having a portion thereof connected to transmit angular movement of the pinion shaft due to steering torque to a power assistance means to augment steering torque, the pinion shaft having a portion thereof extending on the other side of the pinion from the bearing, the connection to the power assistance device being from said extension portion, the pinion shaft being provided with a second bearing located on its extension portion, which second bearing engages an aperture in a lever pivoted at one end, the other end actuating the power assistance means.

2. A power assisted vehicle steering mechanism as claimed in claim 1, in which the said lever is provided with a hole which registers with a further hole in a static part of the mechanism so that a pin may be inserted through both holes for initial centralisation of the lever to be achieved during setting up of the mechanism.

3. A power assisted vehicle steering mechanism comprising:
   a pinion shaft to which a steering torque is applied;
   a pinion on said pinion shaft;
   a rack connected to effect steering of the vehicle upon displacement thereof and having a meshing engagement with said pinion;
   bearing means for supporting said pinion shaft for rotation about the axis of said pinion shaft and for angular displacement in a plane extending parallel to the direction of displacement of said rack, said pinion shaft being angularly displaceable in response to reaction between said pinion and said rack caused by applying steering torque to said pinion shaft;
   a control member associated with said pinion shaft at a location axially spaced from said bearing means and which is displaceable upon angular displacement of said pinion shaft in said plane; and
   means responsive to said displacement of said control member for controlling actuation of power assistance means that provides power assist to the steering of the vehicle.

4. A power assisted vehicle steering mechanism as claimed in claim 3 wherein said bearing means is located on one side of said pinion and said control member is located on the other side of said pinion, and said bearing means comprises a part-spherical bearing.

5. A power assisted vehicle steering mechanism claimed in claim 4 wherein said control member comprises a control lever pivotable about an axis extending parallel to and spaced from the axis of said pinion shaft, and further including a pinion shaft bearing interposed between said pinion shaft and said control lever and permitting rotation of said pinion shaft about its axis relative to said control lever.

6. A power assisted vehicle steering mechanism as claimed in claim 5 further including means for supporting said control lever for pivotal movement about said axis parallel to the axis of said pinion shaft and for angular movement with said pinion shaft.

7. A power assisted vehicle steering mechanism as claimed in claim 6 wherein said controlling means comprises a control valve comprising an axially displaceable spool, said control lever being connected with said spool for axially displacing the same in response to angular displacement of said control lever to thereby cause actuation of the power assistance means.

8. A power assisted vehicle steering mechanism as claimed in claim 6 wherein said controlling means comprises sensor means for actuating the power assistance means, said sensor means generating an actuation signal in response to angular displacement of said control lever.

9. A power assisted vehicle steering mechanism as claimed in claim 8 wherein said sensor means comprises a pair of microswitches.

10. A power assisted vehicle steering mechanism as claimed in claim 9 wherein said sensor means comprises a Hall effect device.

11. A power assisted vehicle steering mechanism having a rack and pinion assembly and including a pinion shaft adapted at one end to receive a steering wheel and to which a steering torque is to be applied; a pinion on the pinion shaft engaging a rack which is displaceable upon rotation of the pinion and which is connected to effect steering of the vehicle; a bearing within which the pinion shaft is mounted for rotation about its axis and located between the pinion and said one end, said bearing restraining a part of the pinion shaft borne thereby from radial displacement and permitting the pinion shaft to exhibit angular play about said restrained part in a gyrational sense during rotation of said pinion shaft; means for retaining the pinion in engagement with the rack, said pinion retaining means engaging a portion of the pinion shaft axially remote from said restrained part and being displaceable to transmit angular movement of the pinion shaft to control power assistance means for augmenting the steering torque, said displacement of the retaining means resulting from angular movement of the pinion shaft due to the reaction of the pinion on the rack during the application of the steering torque.

12. A power assisted vehicle steering mechanism as claimed in claim 11, in which the said bearing between the one end of the pinion shaft and the pinion includes a part-spherical bearing.

13. A power assisted vehicle steering mechanism as claimed in claim 11, in which the power assistance means is actuated by movement of a spool of a spool valve.

14. A power assisted vehicle steering mechanism as claimed in claim 13, in which the spool of the spool valve is provided with centralising means.

15. A power assisted vehicle steering mechanism as claimed in claim 14, in which the centralising means includes a spring which is compressed when the spool is moved in either axial direction, from a neutral position thereof.

16. A power assisted vehicle steering mechanism as claimed in claim 14, in which the centralising means includes an hydraulic chamber, part of the spool passing through said hydraulic chamber, the hydraulic pressure within said chamber reacting against movement of the spool and tending to centralise the spool to its neutral position.

17. A power assisted vehicle steering mechanism as claimed in claim 16, in which the hydraulic pressure within the chamber is dependent on the pressure existing in a steering system and derived from an engine driven pump.

18. A power assisted vehicle steering mechanism as claimed in claim 16, in which the hydraulic pressure within the chamber is dependent on the pressure output of a pump driven by the vehicle transmission system.

19. A power assisted vehicle steering mechanism as claimed in claim 16, in which the hydraulic pressure within the chamber is dependent on the pressure output of a pump driven by an electric motor the speed of which is determined by one or more of a variety of parameters such as vehicle speed, weight, and lateral acceleration.

20. A power assisted vehicle steering mechanism as claimed in claim 16, in which the hydraulic pressure is fed to the chamber directly through the casing.

21. A power assisted vehicle steering mechanism as claimed in claim 16, in which the hydraulic pressure is fed to the chamber axially along the spool valve itself from one of the valve ports.

22. A power assisted vehicle steering mechanism as claimed in claim 11, in which sensor means is provided to detect angular movement of the pinion shaft due to steering torque, said sensor means actuating said power assistance means.

23. A power assisted vehicle steering mechanism as claimed in claim 22, in which said sensor means comprises a pair of microswitches.

24. A power assisted vehicle steering mechanism as claimed in claim 22, in which said sensor means comprises a Hall effect device.

25. A power assisted vehicle steering mechanism as claimed in claim 11 in which the pinion shaft has an extension portion extending on the side of the pinion axially remote from said bearing, said displaceable pinion retaining means being located to engage said extension portion of the pinion shaft.

26. A power assisted vehicle steering mechanism as claimed in claim 25 in which the pinion retaining means comprises a pivoted lever to which said extension portion is rotationally coupled at a position remote from the lever pivot, said lever exhibiting pivotal displacement in response to said angular movement of the pinion shaft and said pivotal displacement serving to control the power assistance.

* * * * *